Nov. 3, 1931.   G. EVORITT   1,830,101
AIRCRAFT VARIABLE PITCH PROPELLER AND BLADE MOUNTING
Original Filed July 10, 1929   3 Sheets-Sheet 1

Inventor
Guy Evoritt

By Clarence A. O'Brien
Attorney

Nov. 3, 1931. G. EVORITT 1,830,101
AIRCRAFT VARIABLE PITCH PROPELLER AND BLADE MOUNTING
Original Filed July 10, 1929 3 Sheets-Sheet 2
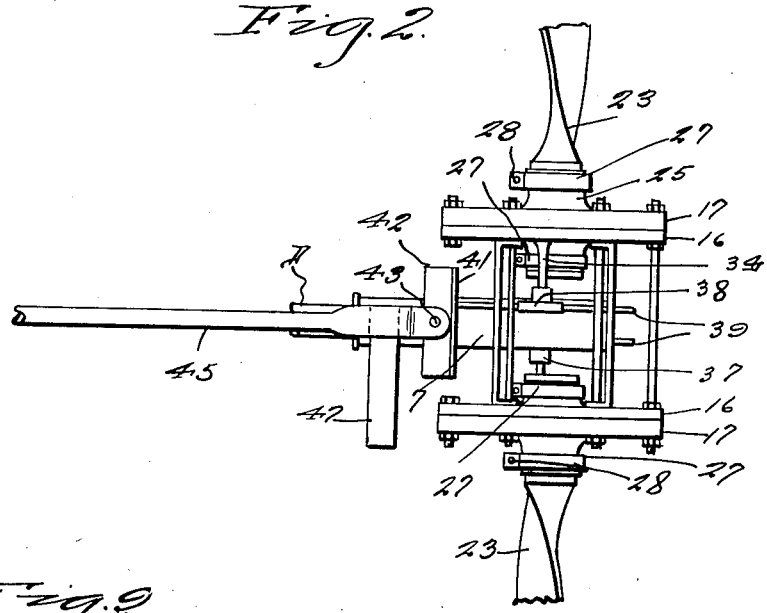
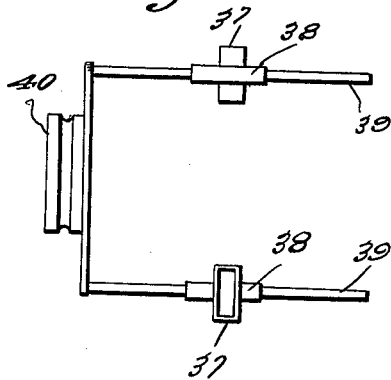
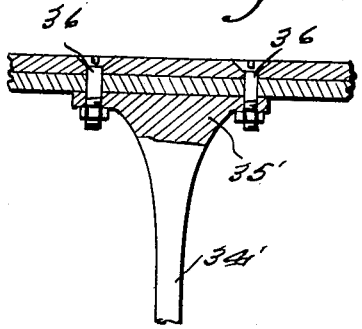
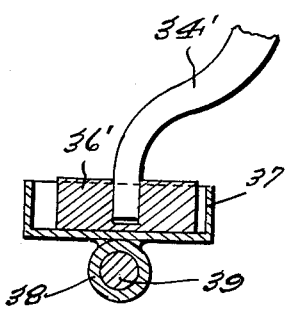
Inventor
Guy Evoritt
By Clarence A. O'Brien
Attorney

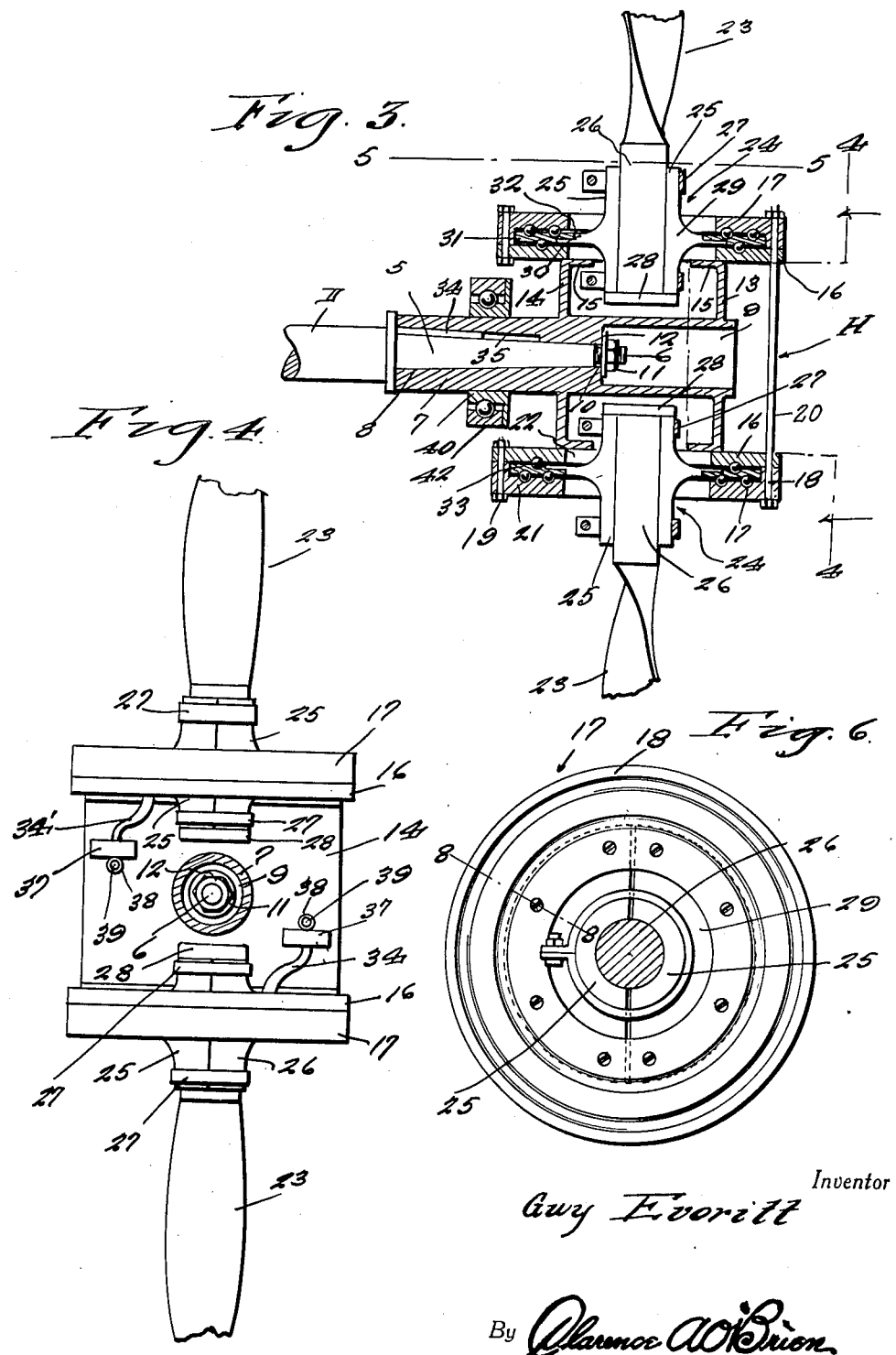

Patented Nov. 3, 1931

1,830,101

UNITED STATES PATENT OFFICE

GUY EVORITT, OF PRINCETON, MISSOURI

AIRCRAFT VARIABLE PITCH PROPELLER AND BLADE MOUNTING

Application filed July 10, 1929, Serial No. 377,162. Renewed June 8, 1931.

This invention relates to certain new and useful improvements in aeroplane propelling means, and has as its primary object the provision of means for quickly and accurately setting or varying the pitch or angle of the blade as conditions may require at the taking off of the aeroplane, or due to the heavy load carried by the same, for the quality of air that may be found at different altitudes.

Aeroplanes at present, for the most part, use a set pitch propeller which cannot be changed, although there are at present a few that can be changed after the motor has become dead. In the general practice of the day, the aeroplane propeller is set at medium pitch or angle, which makes it difficult for a heavily loaded plane to take off, especially at a very low altitude, such as sea level; and as high altitude is obtained and ready for level flying, the motor is still compelled to race along with a medium pitch propeller.

Under certain circumstances the propeller needs different attacks or grips of the air, owing to the load that is carried and the quality of the air that is found at different altitudes.

To attain these different attacks or grips of the air, it is a primary object of this invention to provide a variable pitch propeller which may be manually controlled by the aviator at any period of the flight or at any speed of the motor.

A still further and salient feature of this invention is the provision of a variable pitch propeller which is simple in construction, economical, strong, durable, can be readily and easily operated by the pilot of the aeroplane for obtaining the desired pitch, and which at the same time will be positive in operation, compact, durable, and otherwise well adapted to the purpose for which it is designed.

Other objects and advantages of the invention will become apparent during a study of the following description, taken in connection with the accompanying drawings, wherein:

Figure 2 is an elevational view of the variable pitch propeller per se.

Figure 3 is an enlarged detail sectional view thereof partly in section and partly in elevation.

Figure 4 is a detail sectional view taken substantially on line 4—4 of Figure 3 looking in the direction of the arrows.

Figure 6 is an end view partly in section and partly in elevation.

Figure 9 is a top plan view of the shiftable bearing member and the operating bar connected thereto.

Figure 10 is a fragmentary detail view partly in section and partly in elevation showing the manner of securing the crank arm to the hub section.

Figure 11 is a vertical sectional view illustrating the manner of connecting the crank arm to the operating bars of the slide member.

Figure 1:
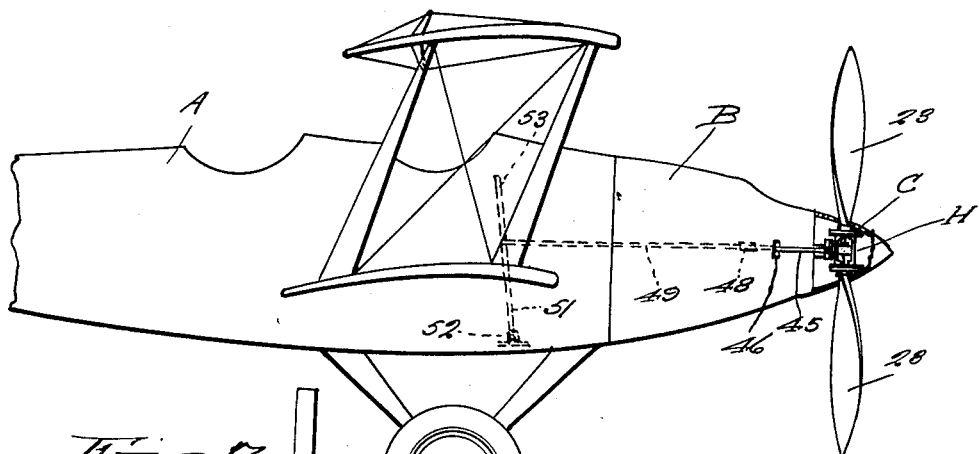
Figure 1 is a fragmentary side elevation of an aeroplane equipped with a variable pitch propeller constructed in accordance with the present invention.
Figure 7:
Figure 7 is a front elevational view of the control lever.
Figure 5:
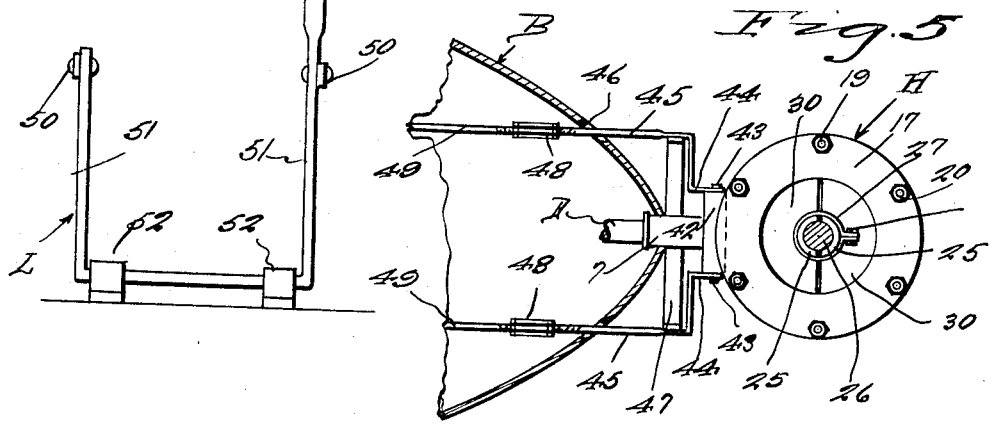
Figure 5 is a detail sectional view taken substantially on the line 5—5 of Figure 3.
Figure 8:
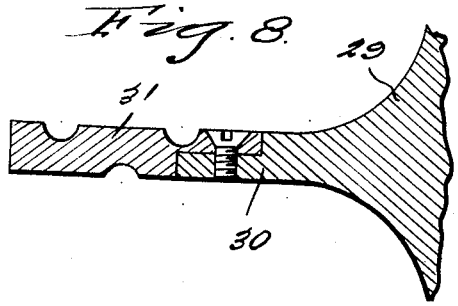
Figure 8 is a fragmentary detail sectional view taken on the line 8—8 of Figure 6.

With reference more in detail to the drawings it will be seen that A designates generally the fuselage of an aircraft, B the nose of the fuselage, and C the hub casing for the propeller which hub casing C is swivelly mounted on the forward end of the nose B in the ordinary manner for rotation with the propeller. The foregoing is shown to advantage in Figure 1.

Attention is next invited to Figure 3, wherein is illustrated to advantage the improved propeller and the method of mounting the same. Upon reference thereto, it will be seen that D designates the propeller or crank shaft of the aeroplane which shaft terminates in a reduced cylindrical tapered extension 5 merging into a reduced and screw-threaded terminal 6 forming a shoulder 7.

The hub of the improved propeller is designated generally by the reference character H. The hub comprises a cylindrical base member 7. The cylindrical base member 7 of the hub is provided with a longitudinally extending tapering bore 8 extending inwardly from one end of said member 7, said bore adapted to receive the tapered portion 5 of the drive or crank shaft D. Extending inwardly from the other end thereof, the cylindrical base member 7 is provided with a pocket 9. The inner wall of the pocket 9 is apertured as at 10 and through which aperture 10 and into the pocket 9 extends the threaded end 6 of the propeller crank shaft. A nut 11 is threaded on this end of the crank shaft which nut bears against a washer 12 for securely maintaining the tapered end 5 of the crank shaft within its socket 8 of the member 7.

Formed integral therewith and at the socketed end of the member 7 and concentric to the member is a plate 13. A similar plate 14 is formed integral with and extends concentrically to the member 7 intermediate the ends of the member 7. The plates 13 and 14 are provided on adjacent side edges with inwardly directed flanges 15—15. Secured to the opposed flanges of the respective plates are annular bearing rings 16—16. Annular bearing caps 17 are each provided with an annular flange 18 which flanges 18 are directed inwardly and have their edges disposed in abutting relation with the marginal edges of the respective bearing wear rings 16—16. The bearing caps 17 are secured to their respective thrust ring 16 through the medium of circumferentially spaced bolts 19 passing through the flange 18 and the adjacent edge of the ring 16. At certain intervals elongated bolts 20 pass through the flanged end 18 of the bearing caps 17 and the respective edge portions of the bearing rings 16—16 as shown to advantage in Figure 3.

Thus it will be seen that each of the bearing caps 17 and its ring 16 cooperate to provide therebetween an annular recess 21. The bearing rings 16—16 are fixed to the flanges 15 of the plates 13 and 14 respectively at opposite diametrical sides of the cylinder base 7 by any suitable fastening means such as designated generally by the reference character 22.

The propeller blades designated generally by 23—23 are oppositely mounted in the hub 8 in a manner to be herein presently described. The said propeller blades are each mounted in secondary hubs or clamps designated generally by the reference character 24. Each of the propeller blades 23 and its secondary hub or clamp 24 is identical in construction, and it is therefore believed a detailed description of one propeller blade and its hub or clamp will suffice.

The secondary hub or clamp 24 comprises a pair of semi-cylindrical matched halves 25—25. The blades 23 are provided on their inner ends with a cylindrical stem or neck 26 receivable in and between the semi-cylindrical halves 25 of the clamps 24. Embracing the ends of the matched halves 25 of the respective clamps 24 are split rings 27, which rings 27 securely clamp the said halves 25 securely about the stem 26 of the respective propellers, said split rings being in turn secured to said ends of the matched halves through the medium of the bolts passing through the lateral ears at the terminals of the clamping ring. At their inner ends the stems 26 of the respective propellers 23 are provided with disc-shaped retaining heads 28, which heads abut the inner edges or ends of the clamped halves 25. Intermediate their ends, and on their outer face, the semicircular halves 25—25 of the clamp 24 are thickened as at 29, which thickened portions 29 terminate in an arcuate plate portion 30.

An annular ball race 31 is disposed circumjacent the secondary hubs or clamps 24 and said annular ball races 31 at their inner circumferential edges are fixed to the arcuate plate portions 30 of the clamp 24 as at 32. The annular ball races 31 are adapted to have turning movement in the recesses 21 formed through the medium of the bearing plate 16 and their caps 17. Arranged in races between the annular race 31, the bearing plate 16 and bearing cap 17 are anti-friction steel balls 33.

It is yet to be mentioned that the cylindrical base member 7 of the hub H is provided on the interior wall of its tapered socket 8 with a suitable keyway 34, and at the tapered extremity of the crank shaft D is provided with a key 35 slidable in the key way to prevent rotation of the base member 7 on the crank shaft D. Obviously, then with the rotation of the crank shaft D the hub H will be rotated for revolving the propeller blade 23 in the usual well known manner.

Each of the secondary axle or clamp members 24 has inwardly and angularly extending control arms 34'. These arms have their base 35' secured to the said clamp members 24 through the medium of bolts 36 passing through one of the matched halves 25 of said clamp members 24 and the base of the control arm 34 as shown to advantage in Figure 10. At their outer ends the control arms 34 have swivelly secured thereto swivel blocks 36'. The blocks 36' of the arms 34' are in turn slidably mounted within substantially rectangular open ended boxings or sockets 37. These boxings or sockets 37 are secured to sleeves 38, which sleeves 38 are in turn rigidly mounted on operating bars 39—39. The boxings 37 are so arranged on their sleeves 38 as to extend substantially transversely of the operating bars 39 as shown to advantage in Figure 9.

Slidably mounted on the tubular base member 7 of the hub H and rearwardly disposed thereon with respect to the plate 14 is a bearing race 40. Secured to one side of the bearing race 40 is an annular disc 41, and from a study of Figure 9 it will be seen that the operating bars 39 have one end fixed to the disc 41 at diametrically opposite points on the disc. Obviously, sliding movement either way of the ball bearing race 40 longitudinally of the cylindrical base 7 of the hub causes reciprocation of the operating arms 39 for imparting a thrust to the control arms 34' turning the secondary blade clamp or hubs 24 together with their races 31 oppositely for varying the pitch or angle of the blade 23.

Means for actuating the sliding ball bearing race 40 and adjusting the blade pitch or angle, there is provided a ball race 42 surmounting the ball race 40 and to which are connected at 43 the terminals 44 of control arms 45—45. The arms 45 are slidable in openings 46 formed in opposite sides of the nose portion B of the aeroplane. Exteriorly of the nose the arms 45 are suitably connected together through the medium of arcuate shaped bar 47. At their inner ends the control rods 45—45 have suitable connections 48 with the terminals of links 49—49. At their outer ends the links 49 are pivotally secured as at 50 to the terminals of the arms 51 of a substantially U-shaped control lever designated generally by reference character L.

The bight portion of the operating lever L is rockably mounted in suitable bearings 52 secured to the bottom of the fuselage A within the pilot compartment. One of the arms 51 of the said lever L has secured thereto at its free end a suitable hand grip extension 53 to facilitate the operation of the lever L for varying the pitch of the propeller blades.

In operation, the propeller blade will revolve upon rotation of the propeller shaft in the usual manner during normal working conditions, but when it is desired for any reason such as enumerated in the statement of the invention, to vary the pitch or angle of the blade, the lever L is rocked either forwardly or rearwardly, whereupon the bearing race 40 will be moved in a corresponding direction for actuating the control or crank arm 34 in a manner hereinbefore clearly set forth, turning the clamps 24 and their respective propeller blades 23 in an opposite direction, with respect to one another.

Even though I have herein shown and described the preferred embodiment of my invention, it is to be understood that the same is susceptible to changes fully comprehended by the spirit of the invention as herein described and the scope of the appended claims.

Having thus described my invention, what I claim as new is:

1. In a device of the character described, the combination of a shaft, a hub fixed to the shaft, said hub being provided on opposite sides with an annular recess forming a guide, a clamp mounted in each of said sides of the hub, said clamp being provided with an annular ball race, movable in the respective guides, propeller blades having stems engaged by the respective clamps to turn with the clamps, an inwardly extending control arm carried by each of said clamps, a bearing consisting of an inner ball race and an outer ball race slidable on said hub, operating bars operatively connecting the inner ball race with each of said control arms, whereby the sliding movement of said bearing will actuate said control arms for rotating the clamps in a direction opposite to one another for varying the pitch of the respective blades, an operating lever, and means operatively connecting said lever with the outer ball race for imparting sliding movement to said bearing.

2. In a device of the character described, the combination of a shaft, a hub fixed to the shaft, said hub being provided on opposite sides with an annular recess forming a guide, a clamp mounted in each of said sides of the hub, said clamp respectively, provided with an annular ball race movable in the respective guides, propeller blades having stems engaged by the respective clamps to turn with the clamps, an inwardly extending control arm carried by each of said clamps, a bearing including an inner ball race and an outer ball race slidable on said hub, operating bars operatively connecting the inner ball race with each of said control arms, whereby the sliding movement of said bearing will actuate said control arm for rotating the clamps in a direction opposite to one another for varying the pitch of the blades, an operating lever, and means operatively connecting said lever with the outer ball race for imparting sliding movement to said bearing, said last mentioned means comprising a pair of arms connected at their ends to diametrical opposite sides of said outer ball race, a pair of links secured at one end to said operating lever, and an operating connection between said links and said arms.

3. In a device of the class described, a shaft, a hub mounted on the shaft for rotation therewith, a propeller blade mounted for turning movement on the hub, whereby to vary the pitch of the propeller blade, a sliding member on the hub for rotation therewith, an operating bar projecting from said sliding member, said propeller blade provided with a control arm, a socket on said operating bar for reception of the free end of said control arm.

4. In a device of the class described, a shaft, a propeller hub secured to said shaft for rotation therewith, oppositely disposed clamp members mounted for turning movement in the hub, a propeller blade carried by each of said clamp members, each of said clamp members provided with a control arm, a member slidable on the hub for turning movement therewith, a pair of co-extensive operating bars carried by said slide member, sockets on said operating bars for receiving the free ends of said control arms, and means for actuating said slide member for imparting rotative movement to said clamp whereby to vary the pitch of the propeller blades.

In testimony whereof I affix my signature.

GUY EVORITT.